United States Patent [19]
Ingham et al.

[11] 4,168,639
[45] Sep. 25, 1979

[54] MACHINE TOOL HAVING A PROGRAMMED TURRET

[75] Inventors: John M. Ingham, North Kingstown; Paul W. Carrier, Pawtucket, both of R.I.

[73] Assignee: Brown & Sharpe Manufacturing Company, North Kingstown, R.I.

[21] Appl. No.: 900,879

[22] Filed: Apr. 28, 1978

[51] Int. Cl.² .................. B23B 21/00; B23B 29/24; B23B 3/16
[52] U.S. Cl. .................. 82/36 A; 82/21 B; 74/826; 29/39
[58] Field of Search .......... 82/36 R, 36 A, 21 R, 82/21 B, 34 D; 74/813 R, 815, 826, 824, 817; 29/39, 46, 48.5 R

[56] References Cited
U.S. PATENT DOCUMENTS

| 2,975,657 | 3/1961 | Samuel | 74/826 X |
| 3,161,084 | 12/1964 | DeValliere | 74/817 |
| 3,545,317 | 12/1970 | Shultz et al. | 82/36 A |
| 3,590,673 | 7/1971 | Foll et al. | 82/21 R |
| 3,717,912 | 2/1973 | Lahm | 29/39 |
| 4,080,849 | 3/1978 | Benjamin et al. | 74/826 |

Primary Examiner—Harrison L. Hinson
Attorney, Agent, or Firm—Barlow & Barlow

[57] ABSTRACT

The invention relates to a machine tool of the type having a rotatable support for the material to be worked upon and a slide movable toward the work carrying a programmed turret with a plurality of tool supports which may be indexed to position one tool at a time for operation on the work and more particularly to mounting of the tool turret for indexing with torsional stiffness and for recessing of the work radially of its axis of rotation by a hydraulic means while maintaining torsional stiffness.

9 Claims, 6 Drawing Figures

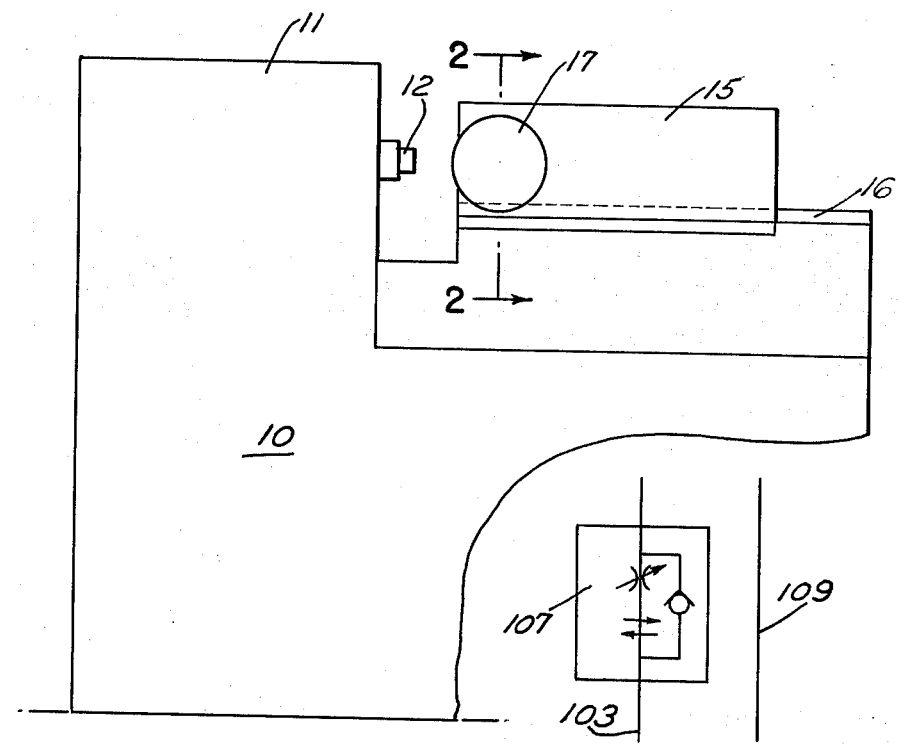
FIG. 1
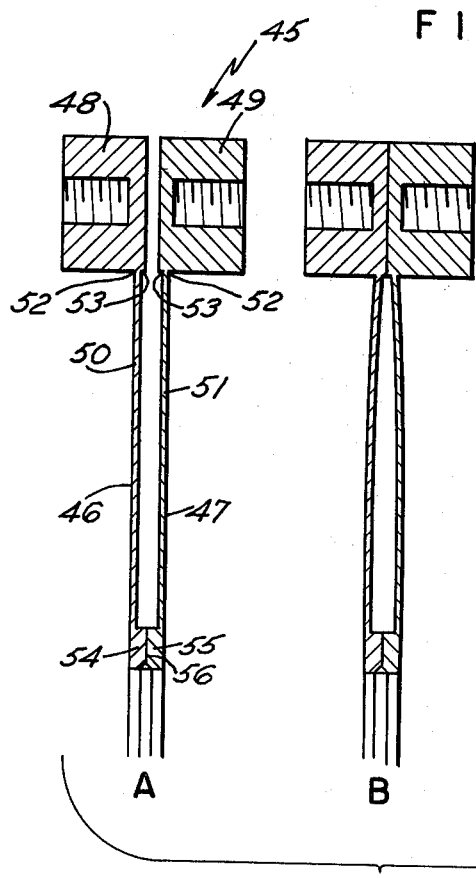
FIG. 4
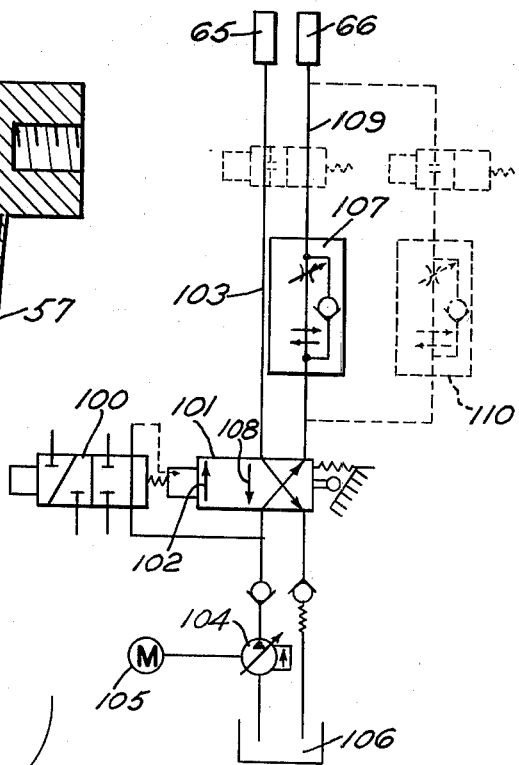
FIG. 5A
FIG. 5

MACHINE TOOL HAVING A PROGRAMMED TURRET

BACKGROUND OF THE INVENTION

A machine tool of the type having a rotatable support for the material to be worked upon and a slide movable toward the work carrying a turret. It has been important to maintain the turret with torsional stiffness while it advances the tools carried by the turret toward the work, and this has been accomplished in some cases by using a brake to prevent rotation of the turret and with clutch means using a spring for holding the clutch surfaces in engagement such as in the patent to Samuels U.S. Pat. No. 2,975,857 which uses a brake above-mentioned as well as a spring for holding the clutch faces together. The clutch faces have been held together by springs in other patents such as U.S. Pat. Nos. De Valliere 3,161,084; Lahm 3,717,912, and Foll 3,590,673.

SUMMARY OF THE INVENTION

The mounting of the turret spindle and tool turret is such that spring means are utilized to hold the turret and spindle sleeve coupled together by a toothed coupling while the spindle sleeve is held against torsional movement by means of a disc-type member secured to the spindle sleeve and to a fixed part of the housing for the spindle sleeve giving the torsional stiffness necessary for machining operations, but also flexibility in the axial direction, allowing the spindle sleeve to be fed out hydraulically to an adjustable stop to permit use for recessing operations, for size adjustment, and for tool relief. This is all encompassed in a machine tool having a program indexing mechanism.

DESCRIPTION OF THE DRAWINGS

FIG. 1 is an elevation showing a machine tool with the turret slide and a rotatable work support upon which the tools of the turret operate;

FIGS. 4A, B and C are diagrammatic fragmental sectional views illustrating three positions of the diaphragm which is utilized in the turret tool mounting;

FIG. 5 is a diagrammatic view illustrating the fluid under pressure which is one means utilized for moving the turret spindle sleeve radially toward the work;

FIG. 5A is a diagrammatic view illustrating the fluid under pressure which is another means utilized for moving the turret spindle sleeve radially toward the work.

DESCRIPTION OF THE PREFERRED EMBODIMENT

Figure 2:
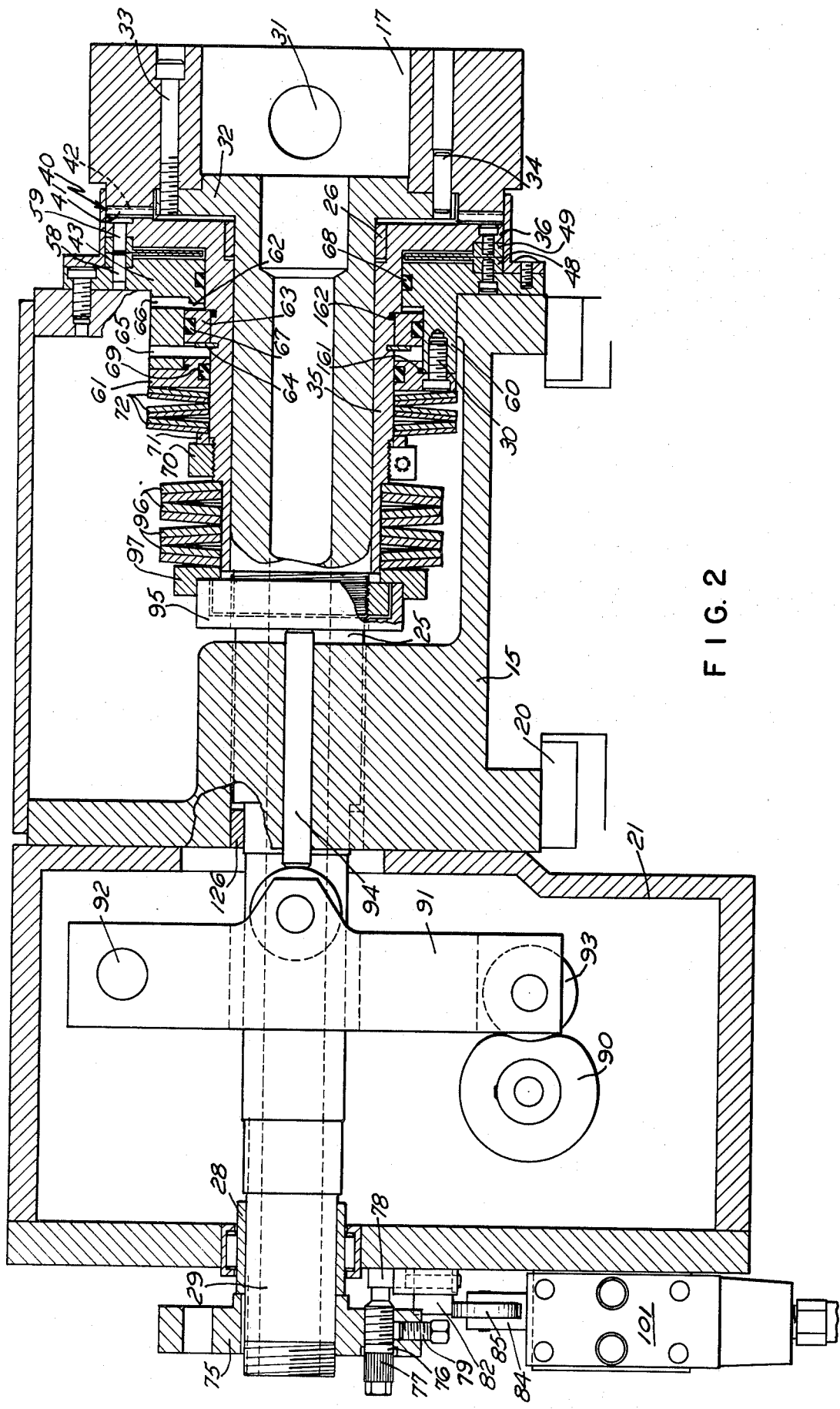
FIG. 2 is a section of the turret slide with the turret spindle therein and the tool turret.

In FIG. 1 the machine base 10 is shown having a frame portion 11 which rotatably supports the work 12. A slide 15 is movable toward and from the work along the slideways 16 and carries a tool turret 17 with a plurality of tool supports (here there being shown 8) so that when a tool is mounted in one of these supports it may be moved into operational engagement with the work 12.

In FIG. 2 the turret slide 15 is provided with a guideway 20 for sliding movement along the slideway 16 of FIG. 1 toward and from the work. This turret slide 15 is essentially a housing for the turret spindle sleeve and operating mechanism, and there is attached to the end of the housing distant from the tool turret a housing 21 containing the indexing mechanism for the tool turret.

A turret spindle 25 is mounted in bearings in the housing such as 26 and 126, and in the indexing mechanism housing as at 28 with its end portion 29 extending beyond the indexing mechanism housing. This turret spindle has mounted upon one end, which protrudes beyond the turret slide, a tool turret 17 which has a plurality of openings 31 into each of which there is mounted a tool holder. One normal positioning of this opening in the tool holder is such that it will align with the work to be operated upon. The tool turret is bolted to the turret spindle which is flanged as at 32 by bolts 33 extending through the tool turret and into the flange 32. Thus, the tool turret and the turret spindle will move together either axially of the turret spindle or rotatably about the center of the axis of the turret spindle and the tool turret. A locating pin 34 may also be provided. Surrounding the turret spindle 25 adjacent to the tool turret is a spindle sleeve 35 which has a flange 36 adjacent to the flange 32 of the turret spindle. This spindle sleeve may be moved axially of the turret spindle. A clutch coupling comprising intermeshing gear teeth 40 in this instance, for example, there being 120 teeth, are shown with half of the tooth coupling 41 fixed on the tool turret and the other half of the tooth coupling 42 fixed on the flange 36 of the spindle sleeve.

A face plate 43 is secured on the turret slide housing and between this face plate 43 and the flange 36 of the spindle sleeve there is located a diaphragm which is shown more particularly in FIGS. 4A, B and C. This diaphragm designated generally 45 is formed of two plates 46 and 47 each with a thicker rim 48 and 49. Each plate has a substantially solid relatively thick heavy rim and is thinned down to provide a flexible portion as 50 and 51. These flexible portions are cut away from the heavier part of the rims 48 and 49 on both faces as seen at 52 and 53 on the inner face and are provided with an inwardly extending inner rim 54 and 55 about the inner opening of the annular diaphragm 45. The inner rims 54 and 55 are welded together as at 56 leaving the other portions of both plates free so that these plates may flex as shown at 57 in FIG. 4C. The rim 48 is fixedly attached to the face plate 43 of the housing by screws located circularly about the portions 48 of the diaphragm, while the heavier outer rim 49 of the diaphragm plate 47 is secured by screws to the flange 36 of the spindle sleeve 35. Locating pins 58 and 59 may be provided.

In order to move the spindle sleeve 35, a hydraulic cylinder is utilized which encircles the sleeve. This cylinder designated generally 60 has one end as the face plate 43, while a cylinder head 61 is provided spaced from this plate 43 and secured to cylinder 60 extending therefrom as at 30 and provides a cylindrical enclosure 62 containing a piston 63 coupled to the sleeve by an encircling ring 64. Inward and outward access openings are provided through the cylinder wall, the inlet opening here being shown as 65 and the exit opening being shown on the other side of the piston as at 66. Thus, as fluid, such as a liquid, when entering the conduit 65 will press against the face of the piston to move the piston, spindle sleeve and turret to the right as shown in FIG. 2 or toward the work, while at the same time forcing liquid on the other side of the piston out through the opening 66. An O-ring 67 in the sidewall of the piston provides a seal as the piston moves along the inner surface of the cylinder. Likewise, O-ring seals are provided between the piston and the spindle sleeve at 162 and on either side of the cylinder as at 68 and 69 also between the head and cylinder as at 161. As the spindle sleeve moves under influence of this pressure on the piston 63, it will move the flange 36 of the spindle sleeve with its clutch face 42 along with the tool turret 17 and turret spindle 25 outward radially of the rotation axis of the work. At the same time, the movement of the spindle sleeve will cause a flexing of the plates 46 and 47 of the diaphragm as shown at 57 in FIG. 4C to allow this movement. The extent of the movement is controlled by a stop at the other end of the turret spindle distant from the tool turret as will be shortly described. A split nut 70 is threaded onto the spindle sleeve and has a washer 71 serving as an abutment for the spindle sleeve hold-back springs 72 which acts between the washer 71 and the cylinder head 61 to be compressed as the spindle sleeve moves forward by action of the hydraulic means and piston 63. When pressure is exhausted from inlet port 65, the spring 72 will move the spindle sleeve away from the work causing the diaphragm portions 48 and 49 to contact as shown in FIG. 4B into seated position. At this time pressure is directed to port 66 to act as a hydraulic assist to springs 72 to develop a seating force sufficent to overcome any unseating forces.

Figure 3:
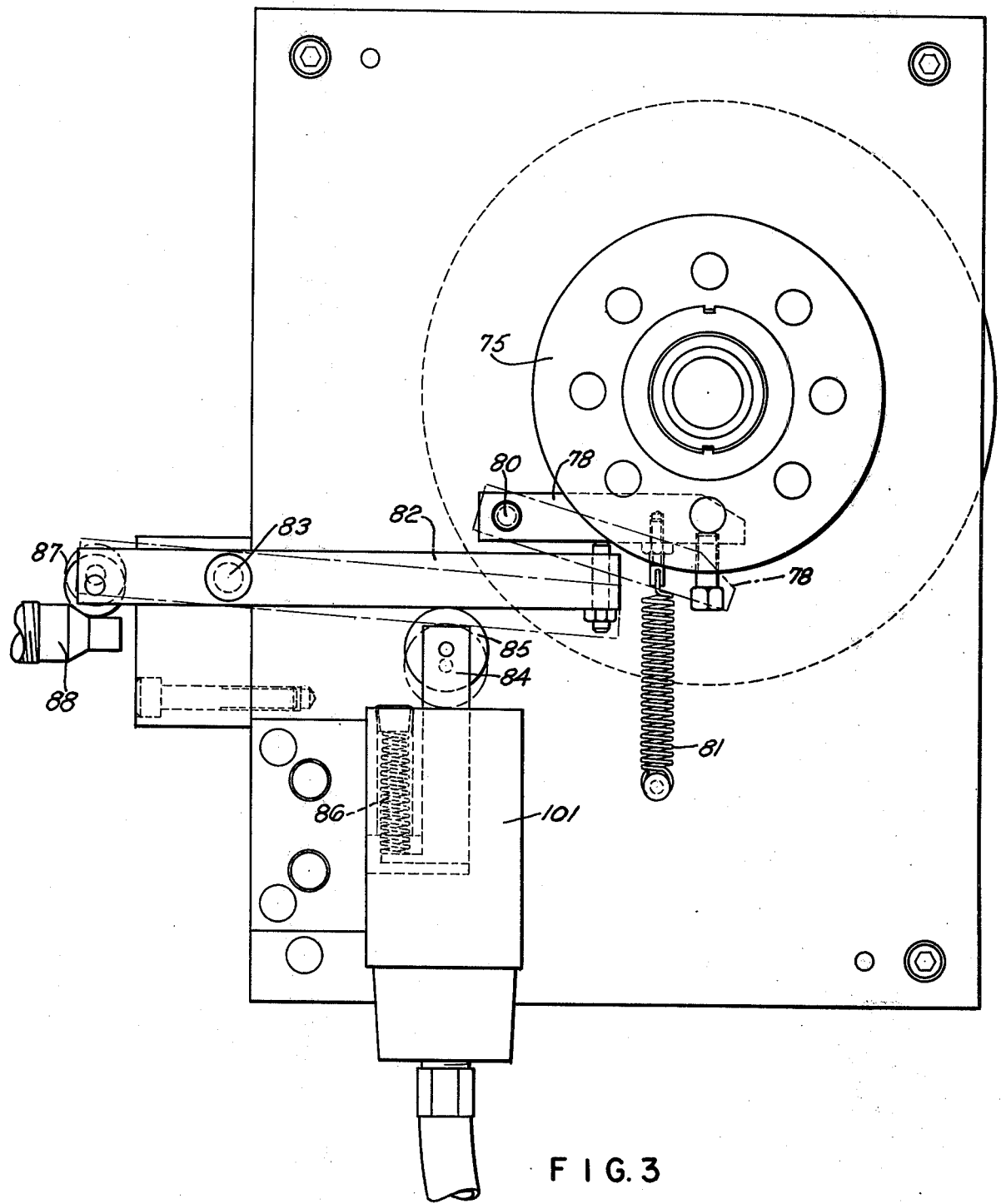
FIG. 3 is an end view of the parts shown in FIG. 2.

At the end of the turret spindle remote from the tool turret, a carrier 75 is provided which carries pins 76 (one for each tool in the turret) threaded therein and graduated as at 77 which protrude an adjusted distance through the carrier to engage an abutment 78 which may be movable toward and from a position to engage one of the pins as will be presently described. This turret spindle depth stop is locked in position by a set screw or lock screw 79. The abutment 78 is pivoted as at 80, FIG. 3, and drawn downwardly by a spring 81 to be out of the way of any of the pins 76 in the carrier 75 when the turret is indexed. However, there is a lever 82 pivoted as at 83 (FIG. 3) which may be actuated upwardly by a plunger 84 and roller 85 as the result of a signal from the machine control to a solenoid operated valve 100. Absence of this signal from the machine control to the solenoid operated valve 100, allows springs 86 and 81 to hold plunger 84 and lever 78 downward to clear pins 76 while turret 17 is indexed. As the turret slide 5 (FIG. 1) moves to the right away from the work, the roller 87 on lever 82 strikes the abutment (rear stop 88) causing the lever 82 to pivot, mechanically driving the roller 85 and plunger 84 downward, thus allowing spring 81 to pull down lever 78. This acts to override the machine control signal to solenoid operated valve 100, if the machine program has not removed this signal before turret indexing is called for.

A cam 90 (FIG. 2) will rock the arm 91 pivoted as at 92 and moved by a roller 93 so as to force the pins 94 against a ring 95 compressing the springs 96 and removing the load from the split nut 97 and also moving the spindle forwardly to uncouple the clutch 40 and permit indexing mechanism in housing 21 to rotate the turret with reference to the turret sleeve.

In FIG. 5 there is illustrated solenoid operated valve 100 which, when it receives a signal from the machine control, will direct pressurized fluid to pilot-operated valve 101 to place its conduit 102 in the line 103 from the pump 104 operated by motor 105 so that fluid from tank 106 will pass to the conduit 65 and engage the piston 63 to move it toward the turret. As the liquid on the other side of the piston is forced through the conduit 66, it returns to the tank 106 through the adjustable orifice control valve 107. This flow control valve can also be inserted in line 103 instead of line 109 (FIG. 5A). This flow control valve may be set to different flow amounts for the control of the speed of movement of the turret sleeve toward the work as above referred to for recessing. When the spindle sleeve has completed its axial movement, a timed signal de-energizes solenoid-operated valve 100 removing pilot pressure from pilot-operated valve 101 and directing pressurized fluid to conduit 66 through both paths in flow control valve 107 to engage piston 63 to move it away from the work forcing the liquid on the other side of the piston through conduit 65 to tank 106. At the same time the de-energization of the solenoid operated valve 100 will permit the spring 81 to draw the lever 82 and the stop 78 clear from a position of possible engagement by one of the pins 76 in the carrier 75.

If the axial motion of different tools is to be at different rates, then a flow control valve may be utilized for each tool as indicated in dotted lines at 110 in FIG. 5.

We claim:

1. In a machine tool, a turret slide, a turret spindle carried by said slide, a tool turret carried by said spindle and having fixed thereto one member of a coupling, an axially movable sleeve embracing said spindle and carrying fixed thereto a second member of said coupling, an annular flexible diaphragm means of V arranged portions and located between said slide and said sleeve with the outer edge of one portion fixed to one and the outer edge of the other portion fixed to the other side of said slide and sleeve and power means acting between said slide and sleeve to move the sleeve providing motion radial to the work axis.

2. A machine tool as in claim 1 wherein said coupling members comprise interengaging teeth.

3. A machine tool as in claim 1 wherein said annular diaphragm means comprising two plate-like parts secured together at their inner edges and separable at their outer edges.

4. A machine tool as in claim 6 wherein the outer edge of one plate is secured to said slide and the outer edge of the other plate is secured to said sleeve.

5. A machine tool as in claim 1 wherein said power means comprises a fluid operated piston housed in said slide and engaging said spindle sleeve.

6. A machine tool as in claim 1 wherein said annular diaphragm means comprising two plate-like parts secured together at their inner edges and separable at their outer edges and spring and hydraulic means acting to return said sleeve when the pressure on said piston is relieved.

7. A machine tool as in claim 1 wherein said turret spindle carrying a depth stop for a tool of the turret to limit the axial movement of the turret spindle and the depth of recessing of the tool into the work.

8. A machine tool as in claim 1 wherein said turret spindle carries an individual depth stop for each tool of the turret to provide a limit to the axial movement of the turret spindle for each tool, thereby providing independent depth of recess, independent adjustment to the limit of axial movement for each tool.

9. A machine tool as in claim 1 wherein said turret slide carries a cylinder providing limited axial movement to the spindle sleeve to provide tool relief on the return stroke of the turret slide.

* * * * *